US012608767B2

(12) United States Patent
Yasukawa et al.

(10) Patent No.:  US 12,608,767 B2
(45) Date of Patent:      Apr. 21, 2026

(54) INFORMATION PROCESSING APPARATUS, INFORMATION PROCESSING METHOD, AND NON-TRANSITORY COMPUTER READABLE MEDIUM

(71) Applicants: NEC CORPORATION, Tokyo (JP); National University Corporation Tokyo Medical and Dental University, Tokyo (JP)

(72) Inventors: Makoto Yasukawa, Tokyo (JP); Keisuke Suzuki, Tokyo (JP); Shuhei Noyori, Tokyo (JP); Akimoto Nimura, Tokyo (JP); Koji Fujita, Tokyo (JP); Takuya Ibara, Tokyo (JP)

(73) Assignees: NEC Corporation, Minato-ku (JP); NATIONAL UNIVERSITY CORPORATION TOKYO MEDICAL AND DENTAL UNIVERSITY, Bunkyo-ku (JP)

( * ) Notice: Subject to any disclaimer, the term of this patent is extended or adjusted under 35 U.S.C. 154(b) by 315 days.

(21) Appl. No.: 18/392,997

(22) Filed: Dec. 21, 2023

(65) Prior Publication Data

US 2024/0212103 A1      Jun. 27, 2024

(30) Foreign Application Priority Data

Dec. 26, 2022      (JP) ................................. 2022-208524

(51) Int. Cl.
  *G06T 5/50*          (2006.01)
  *G06T 7/11*          (2017.01)
  (Continued)

(52) U.S. Cl.
  CPC .................. *G06T 5/50* (2013.01); *G06T 7/11* (2017.01); *G06T 7/13* (2017.01); *G06V 10/761* (2022.01);
  (Continued)

(58) Field of Classification Search
  CPC ..... G06T 5/50; G06T 7/11; G06T 7/13; G06T 2207/20044; G06T 2207/20221; G06V 10/761
  See application file for complete search history.

(56) References Cited

FOREIGN PATENT DOCUMENTS

CN        113971659  A   *   1/2022    ............. G06T 7/246
JP        2008-154655  A       7/2008
WO     WO-2020226182 A1  *  11/2020    ............... A61B 5/08

* cited by examiner

*Primary Examiner* — Mekonen T Bekele
(74) *Attorney, Agent, or Firm* — Sughrue Mion, PLLC

(57)                ABSTRACT

To provide an information processing apparatus and the like that are capable of dividing an image indicating movement of a subject into a chest region and an abdominal region along anatomical knowledge. The information processing apparatus inputs time-series distance image data acquired by measuring a distance from a subject during a breathing exercise. The apparatus calculates a standard deviation image indicating a standard deviation of values for each pixel in a distance image indicated by the time-series distance image data. The apparatus executes division processing of dividing the standard deviation image into the chest region and the abdominal region of the subject by using a differential value in a direction of an intersection line between a sagittal plane and a frontal plane of the subject with respect to the standard deviation image. The apparatus outputs a result of the division processing by superimposing the result on the standard deviation image.

20 Claims, 12 Drawing Sheets

(51) Int. Cl.
*G06T 7/13*        (2017.01)
*G06V 10/74*      (2022.01)

(52) U.S. Cl.
CPC ............... *G06T 2207/20044* (2013.01); *G06T 2207/20221* (2013.01)

1

INFORMATION PROCESSING APPARATUS

INPUT UNIT ~1a

CALCULATION UNIT ~1b

DIVISION UNIT ~1c

OUTPUT UNIT ~1d

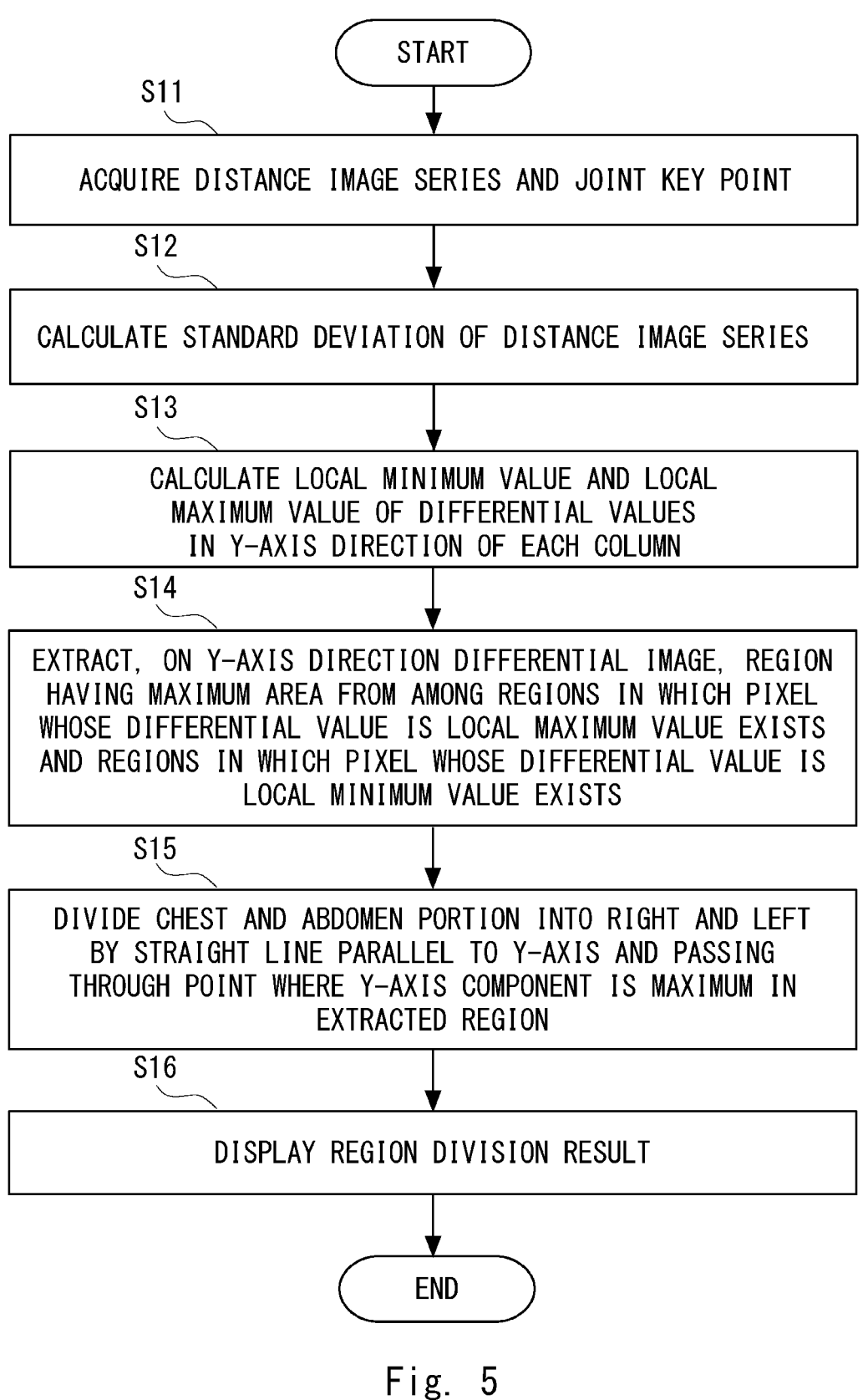

START

S11

ACQUIRE DISTANCE IMAGE SERIES AND JOINT KEY POINT

S12

CALCULATE STANDARD DEVIATION OF DISTANCE IMAGE SERIES

S13

CALCULATE LOCAL MINIMUM VALUE AND LOCAL
MAXIMUM VALUE OF DIFFERENTIAL VALUES
IN Y-AXIS DIRECTION OF EACH COLUMN

S14

EXTRACT, ON Y-AXIS DIRECTION DIFFERENTIAL IMAGE, REGION
HAVING MAXIMUM AREA FROM AMONG REGIONS IN WHICH PIXEL
WHOSE DIFFERENTIAL VALUE IS LOCAL MAXIMUM VALUE EXISTS
AND REGIONS IN WHICH PIXEL WHOSE DIFFERENTIAL VALUE IS
LOCAL MINIMUM VALUE EXISTS

S15

DIVIDE CHEST AND ABDOMEN PORTION INTO RIGHT AND LEFT
BY STRAIGHT LINE PARALLEL TO Y-AXIS AND PASSING
THROUGH POINT WHERE Y-AXIS COMPONENT IS MAXIMUM IN
EXTRACTED REGION

S16

DISPLAY REGION DIVISION RESULT

END

30SL
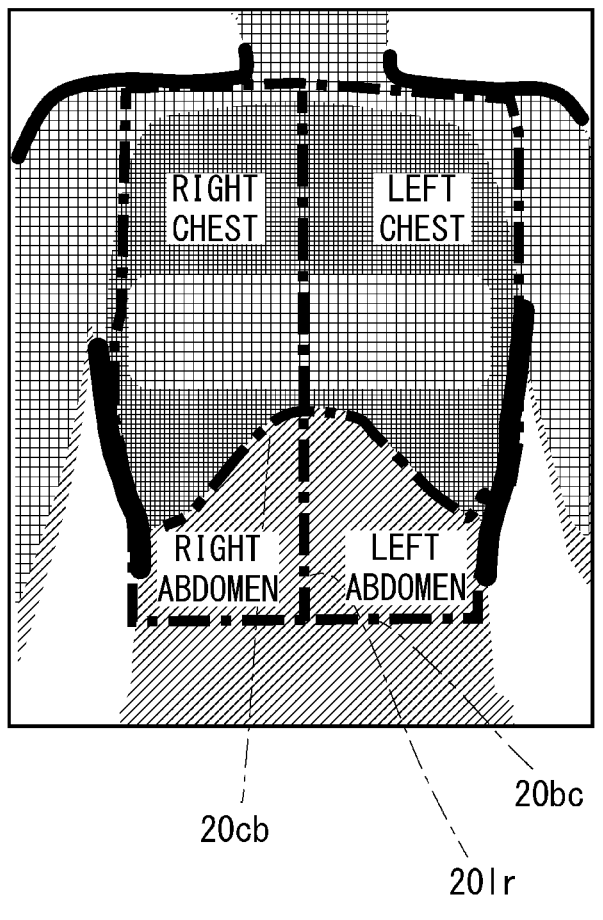
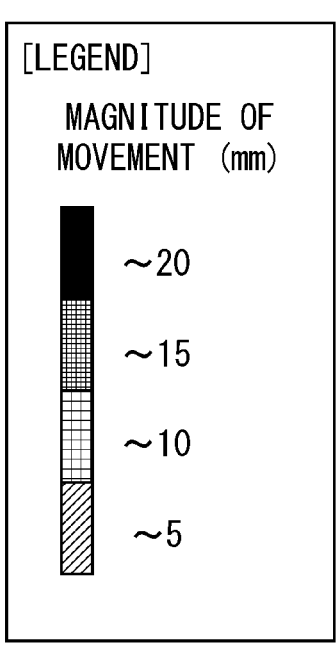
Fig. 11

INFORMATION PROCESSING APPARATUS, INFORMATION PROCESSING METHOD, AND NON-TRANSITORY COMPUTER READABLE MEDIUM

INCORPORATION BY REFERENCE

This application is based upon and claims the benefit of priority from Japanese patent application No. 2022-208524, filed on Dec. 26, 2022, the disclosure of which is incorporated herein in its entirety by reference.

TECHNICAL FIELD

The present disclosure relates to an information processing apparatus, an information processing method, and a program.

BACKGROUND ART

For improving and maintaining a health condition, it is desirable to breathe by a correct breathing method. In order to confirm whether breathing is performed by the correct breathing method, movements of a chest portion and an abdomen portion are detected.

In this regard, Japanese Unexamined Patent Application Publication No. 2008-154655 discloses a technique of using a pattern light projection apparatus and a camera, and measuring, from an image acquired by photographing a chest portion and an abdomen portion of a patient who breathes, a volume change and a breathing time difference in the chest portion and the abdomen portion during a breathing exercise, thereby examining a respiratory system disease.

However, the technique described in Japanese Unexamined Patent Application Publication No. 2008-154655 cannot identify a chest region and an abdominal region in line with anatomical knowledge, and therefore cannot capture accurate movements of the chest portion and abdominal portion.

SUMMARY

In order to solve the above-described problem, an example object of the present disclosure is to provide an information processing apparatus, an information processing method, and a program that are capable of dividing an image indicating a movement of a subject into a chest region and an abdominal region in line with anatomical knowledge.

In a first example aspect according to the present disclosure, an information processing apparatus includes: an input unit configured to input time-series distance image data acquired by measuring a distance from a subject during a breathing exercise; a calculation unit configured to calculate a standard deviation image indicating a standard deviation of values for each pixel in a distance image indicated by the time-series distance image data; a division unit configured to execute division processing of dividing the standard deviation image into a chest region and an abdominal region of the subject, by using a differential value in a direction of an intersection line between a sagittal plane and a frontal plane of the subject with respect to the standard deviation image; and an output unit configured to output a result of the division processing by superimposing the result on the standard deviation image.

In a second example aspect according to the present disclosure, an information processing method includes:

inputting time-series distance image data acquired by measuring a distance from a subject during a breathing exercise; calculating a standard deviation image indicating a standard deviation of values for each pixel in a distance image indicated by the time-series distance image data; executing division processing of dividing the standard deviation image into a chest region and an abdominal region of the subject, by using a differential value in a direction of an intersection line between a sagittal plane and a frontal plane of the subject with respect to the standard deviation image; and superimposing a result of the division processing on the standard deviation image and outputting the superimposed result.

In a third example aspect according to the present disclosure, a program is a program causing a computer to execute information processing of: inputting time-series distance image data acquired by measuring a distance from a subject during a breathing exercise; calculating a standard deviation image indicating a standard deviation of values for each pixel in a distance image indicated by the time-series distance image data; executing division processing of dividing the standard deviation image into a chest region and an abdominal region of the subject, by using a differential value in a direction of an intersection line between a sagittal plane and a frontal plane of the subject with respect to the standard deviation image; and superimposing a result of the division processing on the standard deviation image and outputting the superimposed result.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 5 is a flowchart for explaining an example of processing in the display system according to the present disclosure;

FIG. 11 is a diagram illustrating an example of an image including the division result image displayed on a display device under the control of the information processing apparatus in the display system according to the present disclosure.

EXAMPLE EMBODIMENT

Figure 1:
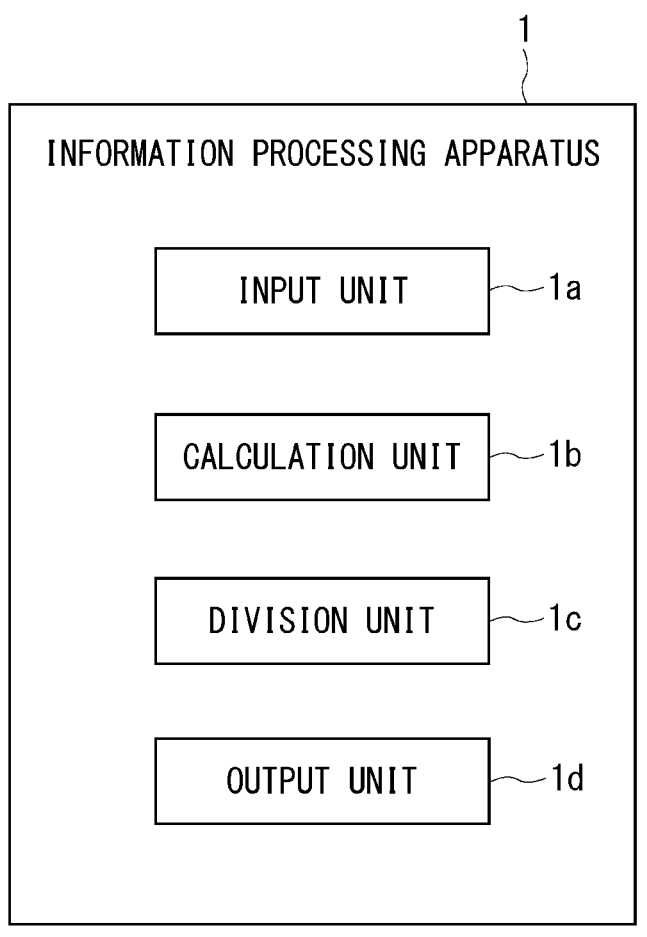
FIG. 1 is a block diagram illustrating a configuration example of an information processing apparatus according to the present disclosure.

Hereinafter, example embodiments will be explained with reference to the drawings. For clarity of explanation, the following description and the drawings are omitted and simplified as appropriate. In the drawings, the same elements are denoted by the same reference numerals, and redundant explanations are omitted as necessary.

First Example Embodiment

A configuration of an information processing apparatus 1 will be described in detail with reference to FIG. 1. FIG. 1 is a block diagram illustrating a configuration example of an information processing apparatus 1 according to the present disclosure. As illustrated in FIG. 1, the information processing apparatus 1 may include an input unit 1a, a calculation unit 1b, a division unit 1c, and an output unit 1d, and may be used, for example, during an examination of a breathing state or during breathing training. Note that the examination of the breathing state may include an assessment of the breathing state.

In order to improve and maintain a health condition, it is desirable to perform breathing with a correct breathing method, and in order to perform the correct breathing, it is desirable to continuously perform correct breathing training based on a guidance of a training instructor such as a doctor or a therapist (hereinafter, simply referred to as "instructor"). For example, breathing training with the correct breathing method may improve health conditions such as a physical function, such as a low back pain, and a mental status.

Herein, in the breathing training, it is considered that an effect of the training is better by the subject breathing in such a way as to satisfy that anteroposterior movements of the chest portion and the abdomen portion are synchronized with each other ("synchronization between the chest portion and the abdomen portion"). Furthermore, it is considered that the training effect is better by the subject breathing in such a way as to satisfy that ribs are sufficiently internally rotated when exhaling (at exhalation) (i.e., a width of the chest portion in a left-right direction becomes sufficiently small during exhalation; "internal rotation of ribs"). However, since it is difficult for the subject himself/herself to confirm the above, i.e., to recognize his/her own breathing state, a system capable of accurately recognizing the breathing state is required. In particular, in order to allow a subject to recognize an accurate analysis result regarding a movement such as synchrony between the chest portion and the abdomen portion as described above, the analysis of the movement such as the synchrony is required to be performed by using a result acquired by dividing the chest portion and the abdomen portion in line with the anatomical knowledge.

In order to enable such division, the information processing apparatus 1 is used. Components of the information processing apparatus 1 will be explained.

The input unit 1a inputs time-series distance image data acquired by measuring a distance from a subject during a breathing exercise. Herein, the subject is a target person who acquires the divided result, such as a person who performs breathing training. During the breathing exercise refers to the fact that the subject is in breathing, and may be defined as being, for example, in deep breathing or being in quiet breathing. Note that the time-series distance image data may also be referred to as distance image series data.

The input source apparatus may adopt various types of sensors capable of measuring a distance to an object, or may adopt a server or the like that stores distance image data acquired from the sensors. The sensor may be, for example, a three-dimensional camera. Examples of the three-dimensional camera include a depth sensor, Light Detection and Ranging (LiDAR), a stereo camera, and the like. Of course, the sensor can also be a depth sensor that is not a category of the three-dimensional camera. The sensor may measure a distance to an object by, for example, a Time of Flight (ToF) method, and the distance measuring method is not limited.

A distance image indicated by the time-series distance image data to be input can be an image in which a distance value as a pixel value is stored in a pixel group associated to a measurement range for each measurement timing (each time). Of course, the distance image may adopt various formats in which the distance value at each time is stored in association with each position (coordinates) of a measurement mesh in the measurement range.

Therefore, the distance image may be a plurality of images associated with each time for each measurement timing, but may be included as information in such a way that a time, a position, and a distance value can be implicitly or explicitly related to each other. The format of the time-series distance image data to be input is not limited as long as the time, the position, and the distance value can be implicitly or explicitly related to each other. Of course, the above-mentioned time can also be a time from the start of the measurement.

Hereinafter, with respect to "images" such as a distance image and a standard deviation image, basically, a value of an optional position in the image is expressed as a value of a pixel associated to the position, i.e., a pixel value of the position.

The calculation unit 1b calculates a standard deviation image indicating a standard deviation of values (pixel values) for each pixel in a distance image indicated by the time-series distance image data. Herein, an average value of pixel values (distance values) of a certain pixel for a period indicated by time-series distance image data is acquired, whereby the standard deviation of the pixel can be calculated as a value indicating a degree of variation from the average value. In other words, the standard deviation of a certain pixel becomes a standard deviation of the pixel value (distance value) in the above-described period, and the number of the standard deviation images calculated by the calculation unit 1b can be one for the time-series distance image data.

Of course, it is also possible to adopt a configuration in which the calculation unit 1b calculates the standard deviation image at every predetermined time period, and adopt a configuration in which the division unit 1c in a subsequent stage calculates a divided standard deviation image at every predetermined time period. However, only an example in which one standard deviation image is calculated by the calculation unit 1b will be explained in the present example embodiment, a second example embodiment to be described later, and the like for the sake of simplification of explanation.

As described above, the standard deviation image can be calculated by acquiring an average value of the values in the above-described time period for all the pixels of the distance image and acquiring a standard deviation value that is a degree of variation from the average value for each pixel. The standard deviation image can be an image in which the standard deviation value of each pixel acquired in this way is arranged in each associated pixel of the original distance image. The standard deviation image thus calculated can express explicitly how much the subject is moving during a breathing exercise, which part is moving a lot, i.e., which position pixel is changing a lot, and the like.

The division unit 1c performs division processing of dividing the standard deviation image into a chest region and an abdominal region of the subject by using a differential value in a direction of an intersection line between a sagittal plane and a frontal plane of the subject with respect to the standard deviation image. The differential value in the direction of the above-described intersection line refers to a differential value in a direction parallel to the above-described intersection line. The direction of the above-described intersection line may be referred to as a height direction or a vertical direction of the subject.

The height direction of the subject can be determined in advance as a predetermined direction indicating the height direction of the subject on the distance image or the standard deviation image, but for example, joint position data acquired by measuring a position of a joint of the subject can be input and determined based on the position of the joint. In the former case, measurement may be performed in a state in which the subject is arranged in a predetermined posture and at a predetermined position. In the latter case, the height direction of the subject can be determined based on a plurality of key-point joint positions indicating the position and posture of the subject among the joint positions of the subject.

In short, in the present example embodiment, the "direction" such as the direction of the intersection line between the sagittal plane and the frontal plane may already match the direction of the subject in the time-series distance image data to be input, but may not match the direction of the subject. In the latter case, for example, the joint position can be used as a matching operation, as described above.

The output unit 1d outputs a result of the division processing by superimposing the result on the standard deviation image. The result of the division processing may be, for example, an image indicating a boundary region such as a boundary line between the chest region and the abdominal region. In other words, the output unit 1d can output an image in which the boundary region is drawn in the standard deviation image.

An output destination of the output unit 1d may be at least one of a display device provided in the information processing apparatus 1, a display device connected to the information processing apparatus 1, a storage device inside or outside the information processing apparatus 1, and a printing device connected to the information processing apparatus 1.

Further, in the above explanation, it is assumed that as the distance image to be processed, a distance image measured by setting an original actual measurement range to the minimum range necessary for output processing is used. However, the distance image to be processed may be a distance image acquired as a result of extracting in advance a range necessary for the output processing among the distance images of the actual measurement range as preprocessing.

Further, in the present example embodiment, a supine position can be adopted as the posture of the subject at the time of acquiring the distance image data, but the present disclosure is not limited thereto, and may be carried out in a supine position, a sitting position, a standing position, a knee standing position, a supine position and a leg raised position, or the like. However, an installation location of the apparatus from which the distance image data are input, the various image processing described above, and the like may be changed as appropriate, depending on the posture. The distance image data may be acquired from the front or back of the subject in accordance with the posture of the subject, but the posture that can be acquired from the front does not need to restrict the breathing of the subject.

With the above-described configuration, the information processing apparatus 1 can explicitly output not only a location where the subject is moving well during the breathing exercise as a standard deviation image, but also can explicitly output the chest region and the abdominal region separately. The information to be output in this way can be used as information for supporting a breathing training. Therefore, the information processing apparatus 1 can be referred to as a breathing training support apparatus. The breathing training is also referred to as a breathing exercise practice.

The information processing apparatus 1 illustrated in FIG. 1 may be, for example, a computer such as a server or a personal computer, or may be an apparatus including dedicated hardware. Specifically, the information processing apparatus 1 may include a computer apparatus including hardware including, for example, one or more processors and one or more memories. At least a part of functions of each unit in the information processing apparatus 1 may be achieved by one or more processors operating in accordance with a program read from one or more memories.

In other words, the information processing apparatus 1 may include a control unit (not illustrated) that controls the whole of the information processing apparatus. The control unit can be achieved by, for example, central processing unit (CPU) or graphics processing unit (GPU), a working memory, a non-volatile storage device storing a program, and the like. This program can be a program for causing the CPU or the GPU to execute the processing of the input unit 1a, the calculation unit 1b, the division unit 1c, and the output unit 1d.

In addition, the information processing apparatus 1 may include a storage device that stores the input time-series distance image data, data in the middle of processing, a division result, and the like, and as the storage device, a storage device included in the control unit may be used for example.

Further, the information processing apparatus 1 is not limited to an example configured as a single apparatus, and may be constructed as a plurality of apparatuses in which functions are distributed, i.e., as an information processing system, and a method of distribution thereof is not limited. In a case of constructing an information processing system in which functions are distributed among a plurality of apparatuses, each apparatus may be provided with a control unit, a communication unit, and as necessary, a storage unit and the like, and the plurality of apparatuses may be connected as necessary by wireless or wired communication and the functions explained in the information processing apparatus 1 may be achieved in cooperation with each other.

Figure 2:
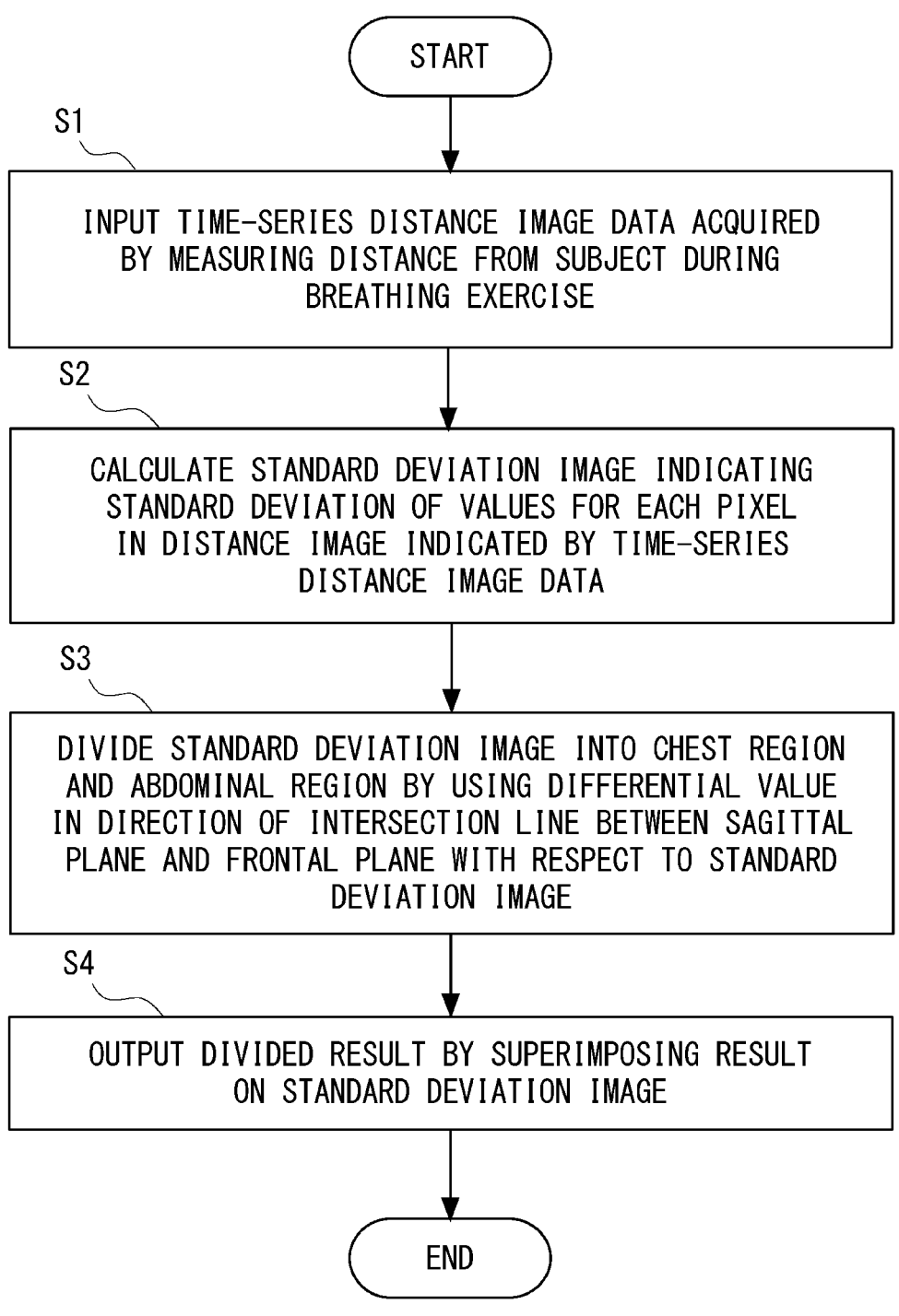
FIG. 2 is a flowchart for explaining an example of an information processing method according to the present disclosure.

Next, a processing example of the information processing apparatus 1 will be explained with reference to FIG. 2. FIG. 2 is a flowchart for explaining an example of an information processing method according to the present disclosure.

First, the information processing apparatus 1 inputs time-series distance image data acquired by measuring a distance from a subject during a breathing exercise (step S1). Next, the information processing apparatus 1 calculates a standard deviation image indicating a standard deviation of values for each pixel in a distance image indicated by the time-series distance image data (step S2).

Next, the information processing apparatus 1 executes division processing of dividing the standard deviation image into a chest region and an abdominal region of the subject, by using a differential value in a direction of an intersection line between a sagittal plane and a frontal plane of the subject with respect to the standard deviation image (step S3). Then, the information processing apparatus 1 superimposes the divided result on the standard deviation image and outputs the superimposed result (step S4), and ends the processing.

As explained above, according to the present example embodiment, it is possible to divide an image (standard deviation image) indicating a movement of the subject into a chest region and an abdominal region in line with anatomical knowledge, i.e., to identify the chest region and the abdominal region of the standard deviation image in accordance with anatomical knowledge.

This effect is supplementarily described. For example, in musculoskeletal disorders such as a low back pain, abnormal breathing patterns occur, and therefore, movement examination and movement evaluation of the chest and abdomen portion during a breathing exercise are important. In addition, since the examination and evaluation by experts are generic, objective and quantitative examination technique and evaluation technique are required. In the present example embodiment, since a thorax (including a part associated to the chest portion) region and the abdominal region can be divided in line with the anatomical knowledge, it can be said that the accuracy of such examination and evaluation can be improved.

In short, according to the present example embodiment, it is possible to perform region identification between the chest region and the abdominal region in line with the anatomical knowledge, thereby achieving the following effects. Namely, according to the present example embodiment, for example, it is possible to accurately calculate a movement feature amount between a chest portion and an abdomen portion by region, and it is also possible to correctly define the movement feature amount for musculoskeletal disorders. Herein, since the movement feature amount is a feature amount indicating a feature of the breathing movement, it can be referred to as a respiratory feature amount. As described above, according to the present example embodiment, it is possible to improve accuracy of the examination for capturing movements of the chest portion and the abdomen portion, and it is also possible to improve precision of estimation of a breathing state of the subject. As a result, according to the present example embodiment, it is possible to improve the accuracy of the evaluation of the breathing movement, and it is also possible to improve accuracy of guidance using the evaluation, thereby enabling effective guidance.

In addition, in the present example embodiment, effective guidance can be performed by use of an instructor such as a therapist at a time of rehabilitation in a medical institution or breathing exercise practice in a healthcare service. Further, in the present example embodiment, by mounting the information processing apparatus 1 on a terminal device or the like to be used by the subject, the subject can receive remote instruction from the instructor or perform voluntary training while being at home.

Second Example Embodiment

Figure 3:
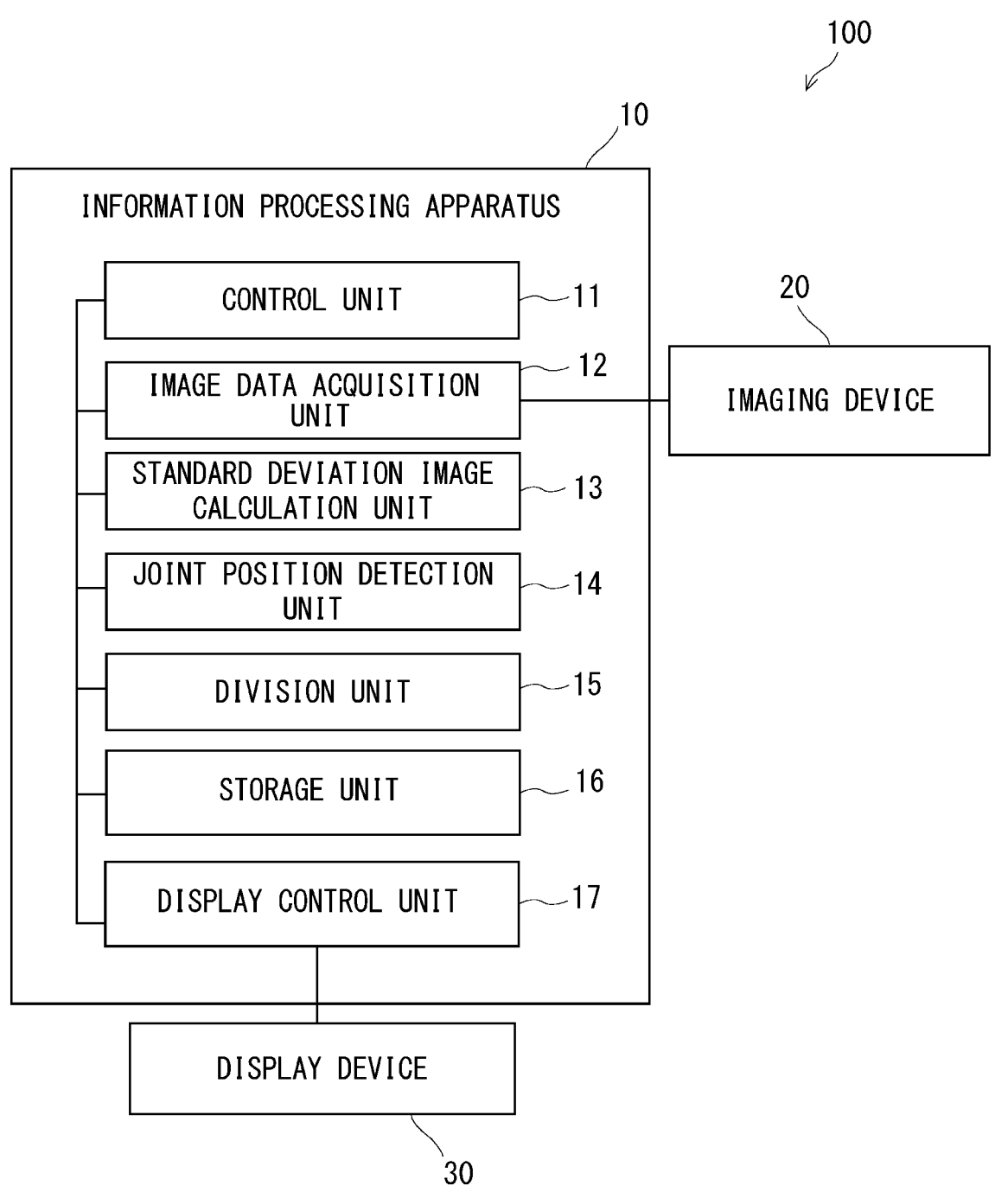
FIG. 3 is a block diagram illustrating a configuration example of a display system including an information processing apparatus according to the present disclosure.

Although the second example embodiment will be mainly explained with reference to FIGS. 3 to 11, various examples explained in the first example embodiment can be applied. First, a configuration example of an information display system (hereinafter, simply referred to as a display system) including an information processing apparatus according to the present example embodiment will be explained with reference to FIGS. 3 and 4. FIG. 3 is a block diagram illustrating a configuration example of a display system including an information processing apparatus according to the present disclosure, and FIG. 4 is a schematic side view illustrating an external appearance of the display system according to the present disclosure.

Figure 4:
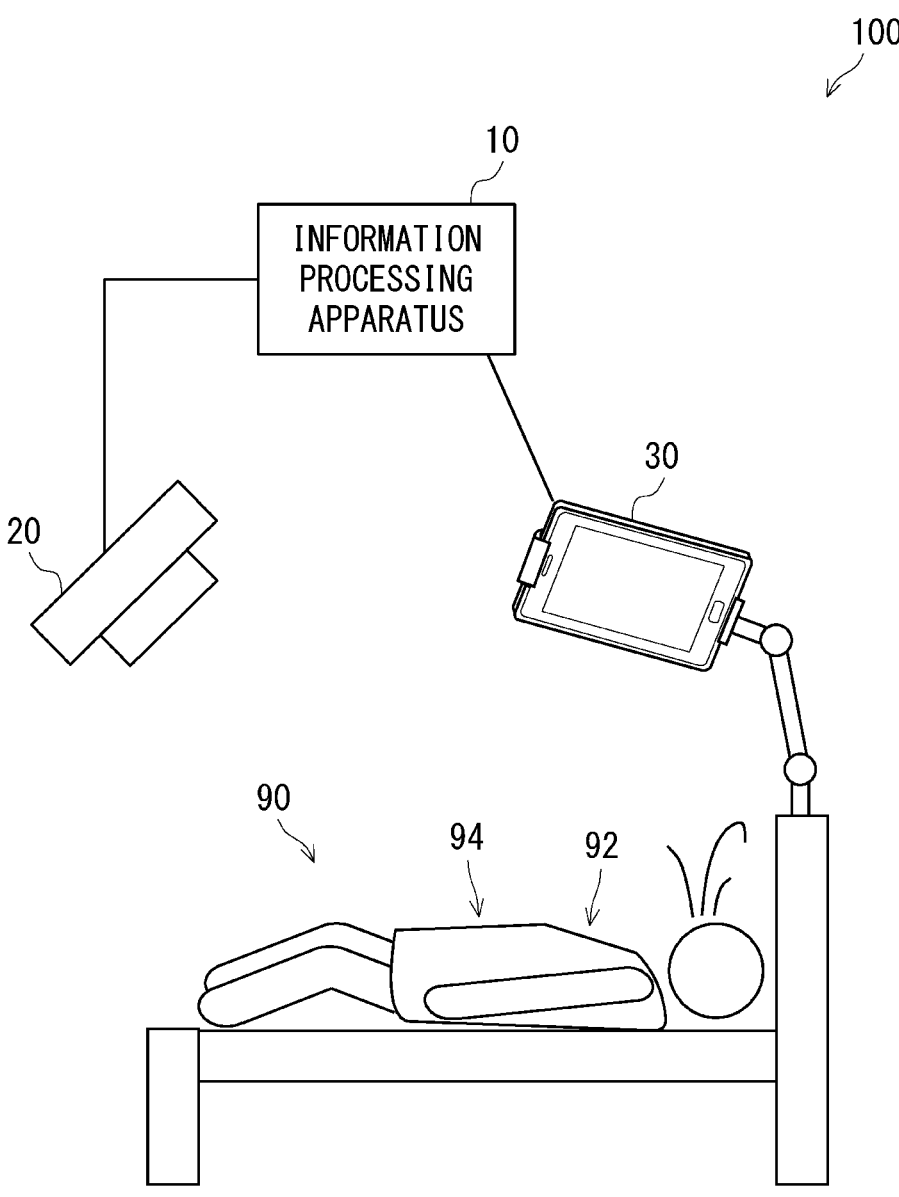
FIG. 4 is a schematic side view illustrating an appearance of the display system according to the present disclosure.

As illustrated in FIGS. 3 and 4, a display system 100 includes an information processing apparatus 10 that is an example of the information processing apparatus 1 in FIG. 1, at least one imaging device 20, and at least one display device 30. The information processing apparatus 10 is an example of the information processing apparatus 1 according to the first example embodiment, and is communicably connected to the imaging device 20 and the display device 30 via a wired or wireless network.

The display system 100 illustrated in FIG. 4 can be used when a subject 90 performs breathing training or examines a breathing state. As illustrated in FIG. 4, the subject 90 can perform breathing training and examination in a supine (supine position) state, but a posture of the subject 90 is not limited to the supine position. However, for the sake of simplicity of explanation, the following description will be given on the assumption that the subject 90 performs breathing training and examination in the supine position.

The imaging device 20 photographs the subject 90 to be a target of breathing training or examination of a breathing state in order to acquire time-series distance image data acquired by measuring a distance from a subject during breathing exercise. The imaging device 20 may be installed at a position where a chest portion 92 and an abdomen portion 94 of the subject 90 can be photographed. When the subject 90 performs breathing training or the like in a supine position, the imaging device 20 may be installed on an upper side of the chest portion 92 and the abdomen portion 94 of the subject 90 as illustrated in FIG. 4, for example. In other words, the imaging device 20 can be installed at a position facing the subject 90 in the supine position.

Note that the subject 90 may perform breathing training or the like in a state of wearing clothes. In this case, the chest portion 92 is a portion associated to the chest portion of the subject 90 in a state of wearing clothes. Similarly, the abdomen portion 94 is a portion associated to the abdomen portion of the subject 90 in a state of wearing clothes. In particular, clothes, such as a compression shirt, that fit a body at least on the upper body of the subject 90 can improve accuracies of various processing such as division processing.

The imaging device 20 may be any imaging device capable of measuring a distance to a target object, and may be, for example, a three-dimensional camera such as a depth sensor, LiDAR, or a stereo camera. The imaging device 20 may measure a distance to an object including at least the subject 90 by various distance measurement methods such as a ToF method. The imaging device 20 may also include a two-dimensional camera (e.g., an RGB camera, etc.).

The imaging device 20 generates time-series image data including at least the chest portion 92 and the abdomen portion 94 of the subject 90 as an imaging range by photographing the subject 90, and transmits the time-series image data to the information processing apparatus 10. In short, the time-series image data may indicate the chest portion 92 and abdomen portion 94 of the subject 90 and images (photographed images) around them. The photographed image may be a moving image or a still image captured at predetermined intervals. In the following description, the term "image" also means "image data indicating images" as a processing target in information processing.

The time-series image data acquired by the imaging device 20 include data indicating time-series distance images, i.e., time-series distance image data. The time-series distance image data can be said to be data indicating a change in the position of the subject 90. In other words, the imaging device 20 can acquire time-series distance image data indicating the position of the subject 90 and the movement that is a change thereof, and transmit the time-series distance image data to the information processing apparatus 10. The distance image data may be, for example, three-dimensional image data represented by three-dimensional point cloud data.

In the information processing apparatus 10, a region of the chest portion 92 and a region of the abdomen portion 94 of the subject 90 can be identified by using time-series distance image data, and this identification method is also one of the main features in the present example embodiment. The identification of such regions, i.e., region division will be described later.

Further, in the information processing apparatus 10, it is possible to detect a change in a position of the body including the chest portion 92 and the abdomen portion 94 of the subject 90, i.e., a movement of the body, by using time-series distance image data. For example, motion capture or the like can be achieved by using the imaging device 20. The position of the detection target may include a position in a vertical direction in the supine position, which is the position in the up-down direction in FIG. 4, and a position in a horizontal direction in the supine position. In particular, the information processing apparatus 10 may be configured in such a way as to detect the movement of the region of the chest portion 92 and the movement of the region of the abdomen portion 94 by using the above-described identification result and time-series distance image data.

In other words, in the information processing apparatus 10, the region of the chest portion 92 and the region of the abdomen portion 94 can be divided based on the time-series distance image data received from the imaging device 20. Further, the information processing apparatus 10 may be configured in such a way as to acquire, based on the division result and the time-series distance image data, chest waveform data that are waveform data indicating a change in the position of the region of the chest portion 92 and abdominal waveform data that are waveform data indicating a change in the position of the region of the abdomen portion 94.

Since the present example embodiment has characteristics of the division processing as described above, the waveform data and the analysis thereof will not be described in detail, but for example, the following processing can be performed.

For example, the information processing apparatus 10 can detect each of displacement amounts of the chest portion 92 and the abdomen portion 94 of the subject 90 by dividing and analyzing the acquired time-series distance image data, based on the division result. The detected displacement amount is acquired as time-series chest waveform data and abdominal waveform data indicating the change. The detected displacement amount may also include a displacement amount in the vertical direction in the supine position and a displacement amount in the horizontal direction in the supine position. Then, the information processing apparatus 10 can calculate a breathing feature amount indicating synchrony between the chest portion 92 and the abdomen portion 94, based on the time-series chest waveform data and the abdominal waveform data. Definition of the respiratory feature amount and the calculation method thereof are not limited.

Furthermore, skeletal data indicating a skeleton (joint) of the subject 90 that has been photographed may be generated by using the imaging device 20. The skeleton data are data indicating a position of the joint of the subject 90. The skeleton data can be acquired, for example, by the imaging device 20 or the information processing apparatus 10 recognizing the joint of the moving person. In the following description, an example in which processing of recognizing a joint, i.e., processing of detecting the joint is executed on a side of the information processing apparatus 10 will be explained, but a configuration that is executed on a side of the imaging device 20 may be adopted.

Further, as described above, the image data acquired by the imaging device 20 include the distance image data, but may also include two-dimensional image data such as an RGB image. Alternatively, the image data acquired by the imaging device 20 may be data indicating an image acquired by combining a two-dimensional image and a three-dimensional image. Accordingly, the distance image data may indicate position information regarding a position of the surface of the photographed subject 90 as three-dimensional coordinates by the three-dimensional point cloud data or the like. The two-dimensional image data or the three-dimensional image data may be used for acquiring the above-described skeleton data or may include the above-described skeleton data itself. The imaging device 20 transmits the generated image data to the information processing apparatus 10.

The information processing apparatus 10 performs control of calculating a standard deviation image, based on time-series distance image data, dividing the region of the chest portion 92 and the region of the abdomen portion 94, superimposing a result of the division on the standard deviation image, and displaying the result on the display device 30. In short, the display device 30 can display the standard deviation image including the division result under the control of the information processing device 10. This will be described later with reference to specific examples.

Further, the information processing apparatus 10 can also perform control of displaying, on the display device 30, information related to the training of the subject 90 other than the standard deviation image including the division result, for example, information such as a phase difference between the chest portion 92 and the abdomen portion 94 calculated from the chest waveform data and the abdominal waveform data. In short, the display device 30 can display information related to the training of the subject 90 other than the standard deviation image including the division result under the control of the information processing device 10.

Further, in the display device 30, the information can be displayed as information for the subject 90 or as information for an instructor, and the display contents can be made different in consideration of clarity or the like depending on a target person of browsing. For example, when the display device 30 is a display device possessed by the instructor, information for the instructor can be displayed.

Further, as illustrated in FIG. 4, the display device 30 may display an image for the subject 90 when being installed above a head of the subject 90. For example, the display device 30 may display an image for the subject 90 when a camera built in the display device 30 detects a face of the subject 90.

Although the following will be explained on the assumption that the display device 30 is used for the subject 90 to browse the information, the display device 30 may be used for the instructor to browse the information, or a plurality of display devices 30 for the subject 90 and the instructor may be provided in the display system 100.

The display device 30 is arranged in such a way as to display an image at a position visible from the subject 90. The display device 30 includes, for example, a display for displaying an image. The display device 30 includes, for example, Liquid Crystal Display (LCD), but is not limited thereto. The display device 30 may be achieved by an organic electro-luminescence (EL) display, a projector, or the like. The display device 30 may be, for example, a smartphone a tablet terminal, or the like. Examples of the contents displayed by the display device 30 will be described later.

Next, a specific configuration example of the information processing apparatus 10 will be explained. As illustrated in FIG. 3, the information processing apparatus 10 may include a control unit 11, an image data acquisition unit 12, a standard deviation image calculation unit 13, a joint position detection unit 14, a division unit 15, a storage unit 16, and a display control unit 17.

The control unit 11 is a part that controls the entire information processing apparatus 10, and may include a processor such as a CPU or a GPU. The control unit 11 has a function as an arithmetic device that performs control processing, arithmetic processing, and the like, and controls the image data acquisition unit 12, the standard deviation image calculation unit 13, the joint position detection unit 14, the division unit 15, the storage unit 16, and the display control unit 17.

The image data acquisition unit 12 may include an interface such as a communication interface for wired or wireless connection to the imaging device 20. Then, the image data acquisition unit 12 acquires image data acquired by photographing the subject 90 during a breathing exercise from the imaging device 20. The acquired image data including the time-series distance image data (hereinafter, also referred to as a distance image series) are data measured for one or a plurality of breathing cycles of the subject 90, whereby the region determination based on the data for the breathing cycles of the subject 90 becomes possible. The image data acquisition unit 12 outputs at least time-series distance image data among the acquired image data to the standard deviation image calculation unit 13. Further, the image data acquisition unit 12 can output the acquired image data to the joint position detection unit 14.

In particular, the acquired image data, including the distance image series, may be data measured while the subject 90 is breathing deep. As described above, during the breathing exercise as an acquisition target period of the distance image series indicates that the subject 90 is inbreathing, and for example, the subject 90 may be in deep breathing.

Of course, during the breathing exercise may be during quiet breathing or a period of time during which the subject 90 is allowed to breathe freely, even not during the deep breathing. It can be said that the image data during deep breathing or during quiet breathing are beneficial from a point that the breathing movement of the subject 90 is easier to be compared with those of other subjects than other cases, or it is easier to identify a musculoskeletal disorder than the other cases.

The standard deviation image calculation unit 13 calculates a standard deviation image indicating a standard deviation of values for each pixel in a distance image indicated by the distance image series, and outputs the standard deviation image to the division unit 15.

The joint position detection unit 14 detects the position of the joint of the subject 90, based on the image data acquired by the image data acquisition unit 12, and outputs the detection result to the division unit 15 as joint position data. Note that a function of acquiring joint position data may be provided on a side of the imaging device 20, and in this case, the information processing apparatus 10 may be configured not to include the joint position detection unit 14.

The joint position data can be acquired by performing image analysis on the two-dimensional image data captured by the two-dimensional camera included in the imaging device 20 or by performing image analysis on the distance image data captured by the imaging device 20. For example, a predetermined mark may be attached to a joint of the subject 90 for a joint that needs to be positioned in advance in the image analysis, and the predetermined mark may be detected. However, a method of acquiring the joint position data and a detection method for detecting the position of the joint are not limited to these, and various known techniques such as a motion capture technique can be used.

Further, the joint position data can be used in left-right division processing of dividing a left-side region and a right-side region of the subject 90 in the division unit 15. The left-right division processing is a part of the division processing to be executed by the division unit 15 and will be described later.

Note that the joint position data can also be used as follows. In other words, the joint position data can be used in order to delete information of a region that is not required in future for the image data including the input distance image series. Joint position data can also be used in order to adjust the direction and position of the intersection line of each plane for a sagittal plane, a frontal plane, and a transverse plane of the subject 90 to be suitable for processing, with respect to the image data including the input range image series.

Of course, at a time of acquiring image data such as a distance image series, it is also possible to devise such that the subject 90 has a correct position and orientation suitable for processing. The devisal may also include displaying, on the display device 30, advice for correcting the position and orientation of the subject 90, based on the joint position data.

Note that various existing techniques can be used to detect the joint. The joint may be detected based on the distance image data, or may be detected based on RGB two-dimensional image data. Various detection algorithms to be used for the detection of the joint are distributed, but the number and the position to be detected differs depending on the detection algorithm, and therefore, the joint key point matching the purpose of use may be selected according to the detection algorithm to be used.

The division unit 15 inputs not only the standard deviation image calculated by the standard deviation image calculation unit 13, but also joint position data acquired as a result of detection by the joint position detection unit 14, i.e., joint position data acquired by measuring the position of the joint of the subject 90.

The division unit 15 executes division processing including chest and abdominal division processing of dividing the standard deviation image into a region of the chest portion 92 (a chest region) and a region of the abdomen portion 94 (an abdominal region) of the subject 90 by using a differential value in the direction of the intersection line between the sagittal plane and the frontal plane of the subject 90 with respect to the standard deviation image. The differential value in the direction of the intersection line refers to a differential value in a direction parallel to the intersection line. The direction of the intersection line may be referred to as a height direction or a perpendicular direction of the subject 90. An example of the standard deviation image, an example of the chest and abdominal division processing, and an example of left-right division processing will be described later with specific examples.

The left-right division processing refers to processing of dividing the standard deviation image into a left-side region and a right-side region, based on the joint position indicated by the joint position data. The left-side region may refer to a region on a left side toward the front of the subject 90 (in a direction perpendicular to the sagittal plane of the subject 90), and the right-side region may refer to a region in a right side toward the front of the subject 90. Note that the left-right division processing can be executed before or after the division processing of the chest region and the abdominal region (hereinafter, the chest and abdominal division processing). However, in the example of the left-right division processing to be described later with reference to FIG. 5 and the like, since a result of the chest and abdominal division processing is used, the processing is executed after the chest and abdominal division processing.

Further, the joint position data to be used in the left-right division processing may be data acquired by measuring the position of the joint of the subject 90 at least at one time of a period associated to the distance image series. The left-right division processing is basically processing of dividing the subject 90 in the sagittal plane, and it is assumed that, depending on the breathing movement of the subject 90, the dividing result in the left-right division processing is not affected. Therefore, it is sufficient when the position of the joint is measured at least at any time in the period associated to the distance image series.

However, the joint position data are not limited to data at one time, such as data at the first, intermediate, or last time of the distance image series, and may be average data of a period associated to the distance image series. Further, in the example of the left-right division processing to be described later with reference to FIG. 5 and the like, since a result of the chest and abdominal division processing is used, as a result, it can be said that the joint position data are data measured for a period associated to the distance image series.

In the left-right division processing described above, the standard deviation image can be divided into a left-side region and a right-side region with the position of a predetermined joint indicated by the joint position data as a reference point. This reference point may be referred to as a joint key point. By setting the reference point to two or more points, i.e., by setting the position of the predetermined joint of two or more points as the reference point, it is possible to perform more accurate left-right division processing. The predetermined joint may include, for example, a hip and a neck, or may include an upper end of the sternum. However, by using image data acquired by photographing the entire body of the subject 90 and applying left and right ankles and a neck or the head as a predetermined joint, more accurate left-right division processing can be performed. The present disclosure is not limited to this example, and it is possible to stably acquire the position of a predetermined joint by using image data acquired by photographing the entire body.

The storage unit 16 is, for example, a storage device such as a memory or a hard disk. The storage unit 16 is, for example, a ROM (Read Only Memory) or a RAM (Random Access Memory). The storage unit 16 has a function for storing a control program, an arithmetic program, and the like that are executed by the control unit 11. Further, the storage unit 16 has a function of temporarily storing data or the like during processing, and a function of storing target information for displaying data after processing on the display device 30 by the display control unit 17, which will be described later.

The display control unit 17 may include an interface such as a communication interface for wired or wireless connection to the display device 30. The display control unit 17 is an example of the output unit 1*d* in FIG. 1, and controls the display device 30 to display a result of the division processing in the division unit 15 by superimposing the result on the standard deviation image calculated by the standard deviation image calculation unit 13. The result of the division processing may be, for example, an image indicating a boundary region such as a boundary line between the chest region and the abdominal region. With such a display control, in the display device 30, a boundary region such as a boundary line between the chest region and the abdominal region can be superimposed on the standard deviation image and displayed.

The components of the image data acquisition unit 12, the standard deviation image calculation unit 13, the joint position detection unit 14, the division unit 15, and the display control unit 17 in the information processing apparatus 10 can be achieved by executing a program under the control of the control unit 11, for example. More specifically, these components can be achieved by the control unit 11 executing a program stored in the storage unit 16. In addition, necessary programs may be recorded in an optional nonvolatile recording medium and installed as necessary, and thereby may achieve each component.

Further, each component is not limited to being achieved by software by a program, and may be achieved by any combination and the like of hardware, firmware, and software. In addition, each component may be achieved by use of an integrated circuit, which is programmable by a user, such as a field-programmable gate array (FPGA) or a microcomputer. In this case, by use of the integrated circuit, a program composed of the above-described components may be achieved.

Next, an example of processing in the display system 100 will be explained with reference to FIGS. 5 to 11. FIG. 5 is a flowchart for explaining an example of processing in the display system 100 according to the present disclosure.

Figure 6:
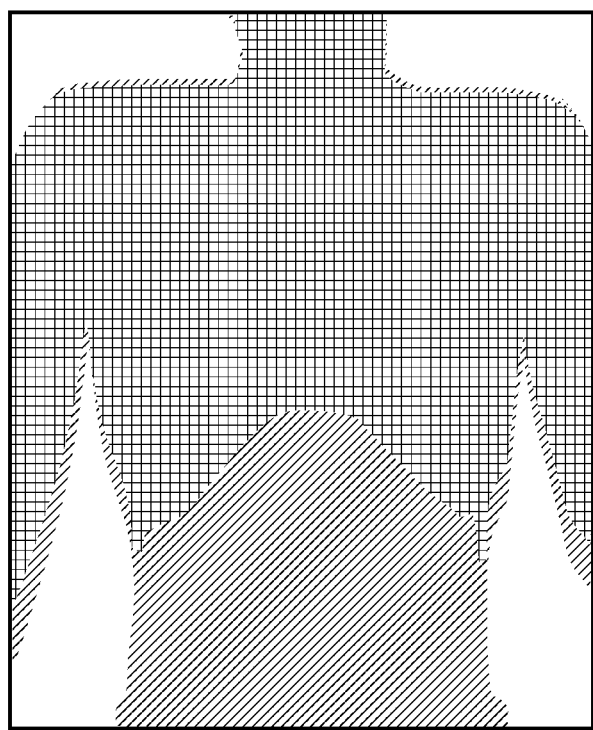
FIG. 6 is a schematic diagram illustrating an example of a distance image acquired by an imaging device in the display system according to the present disclosure.
Figure 7:
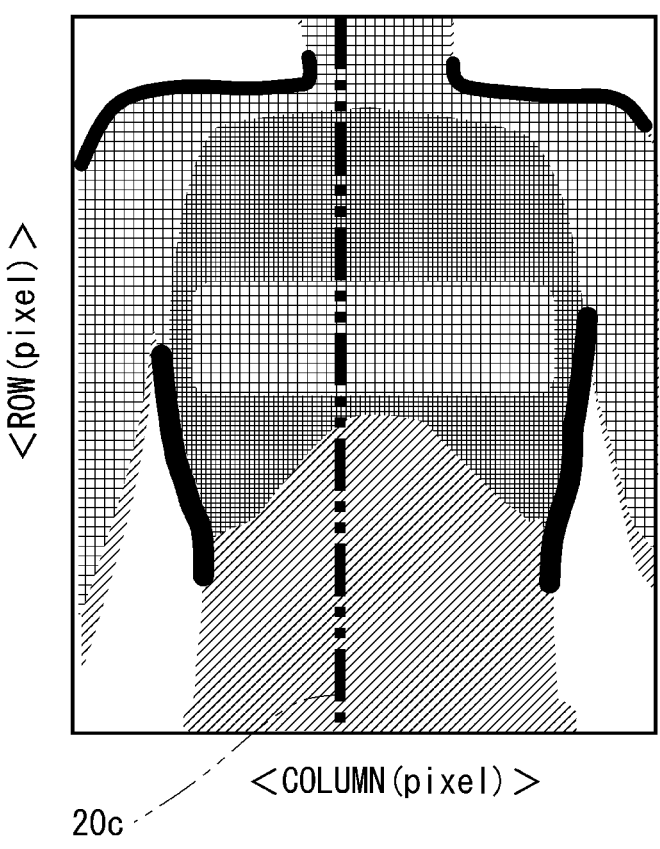
FIG. 7 is a schematic diagram illustrating an example of a standard deviation image calculated from the distance image by the information processing apparatus in the display system according to the present disclosure.
Figure 8:
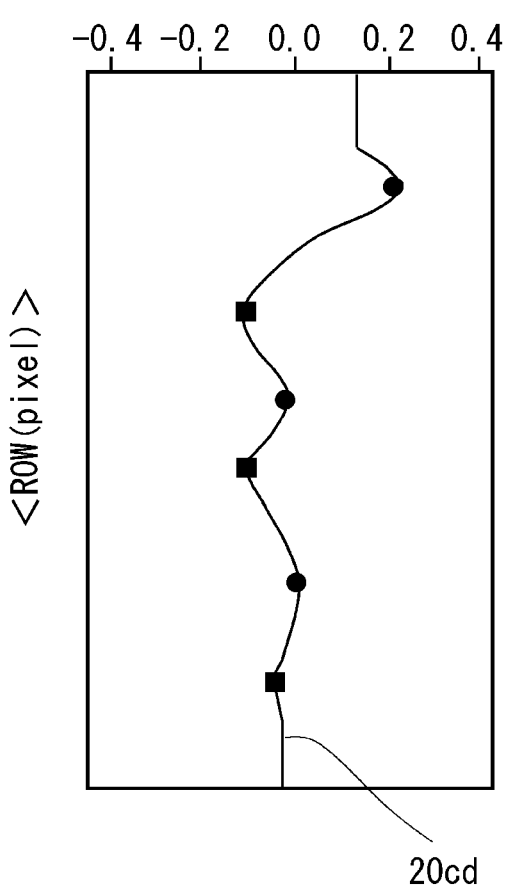
FIG. 8 is a graph illustrating an example of a differential value that is calculated for a certain pixel column in the standard deviation image by the information processing apparatus in the display system according to the present disclosure.

FIG. 6 is a schematic diagram illustrating an example of a distance image acquired by the imaging device 20 in the display system 100 according to the present disclosure. FIG. 7 is a schematic diagram illustrating an example of a standard deviation image calculated from the distance image in FIG. 6 by the information processing apparatus 10 according to the present disclosure. FIG. 8 is a graph illustrating an example of a differential value calculated for a certain pixel column in the standard deviation image in FIG. 7 by the information processing apparatus 10 according to the present disclosure.

Figure 9:
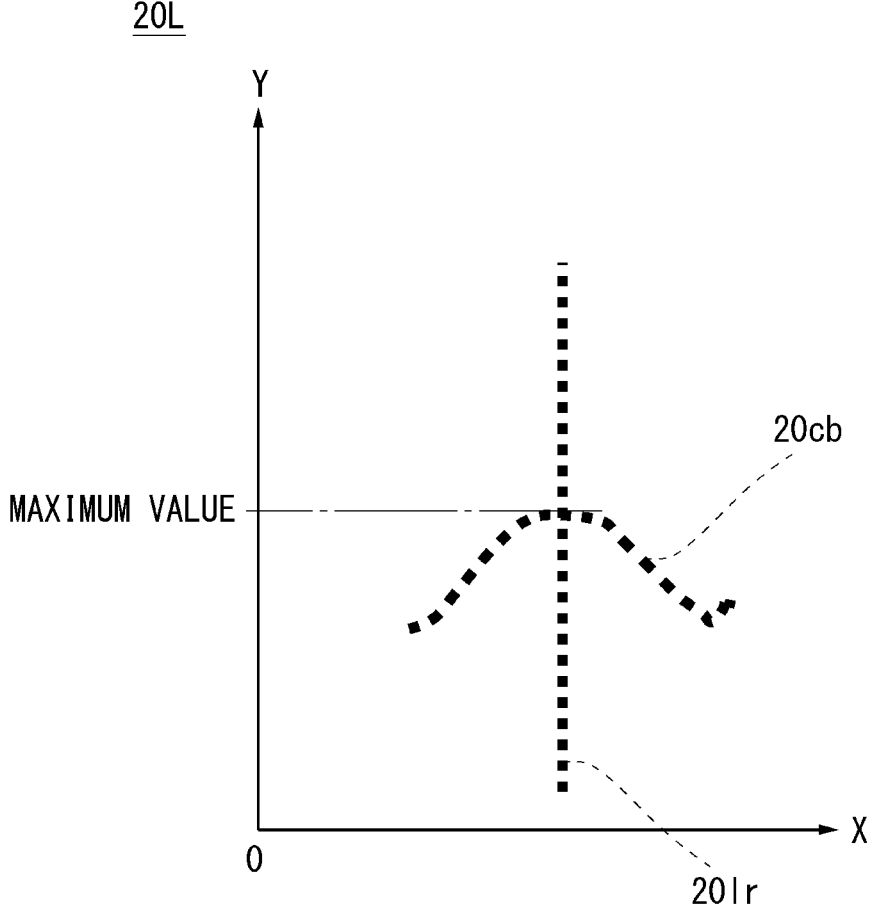
FIG. 9 is a diagram illustrating an example of a division line determined by the information processing apparatus in the display system according to the present disclosure.
Figure 10:
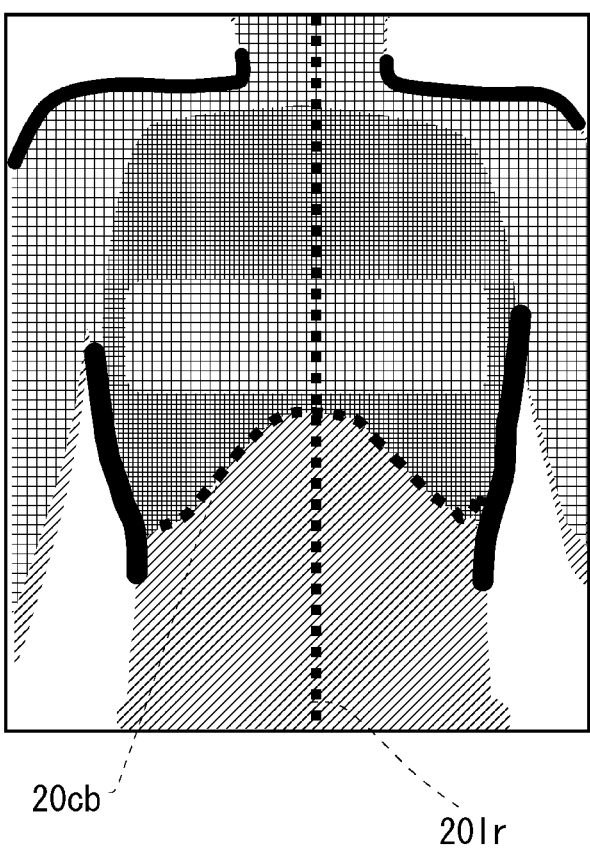
FIG. 10 is a diagram illustrating an example of a division result image generated by the information processing apparatus in the display system according to the present disclosure.

FIG. 9 is a diagram illustrating an example of a division line determined by the information processing apparatus 10 according to the present disclosure. FIG. 10 is a diagram illustrating an example of a division result image generated by the information processing apparatus 10 according to the present disclosure. FIG. 11 is a diagram illustrating an example of an image including the division result image in FIG. 10, which is displayed on the display device 30 under the control of the information processing apparatus 10 according to the present disclosure.

However, the processing in the display system 100 is not limited to the example to be explained below. For example, although an example will be explained in which part of the joint position data are data acquired by performing image analysis of a distance image series, the joint position data may be acquired by the imaging device 20, in other words, the joint position data may be data acquired independently of the distance image data.

First, in the information processing apparatus 10, the image data acquisition unit 12 acquires, from the imaging device 20, a distance image series acquired by measuring a distance from the subject 90 during a breathing exercise and a joint key point indicating a position of a joint of the subject 90 (step S11). The joint key point acquired in step S11 is part of the joint position data and can be used in order to remove data of an unnecessary region from the distance image series.

The distance image at one time indicated by the distance image series can be, for example, a distance image 20D as illustrated in FIG. 6. In FIG. 6, for the sake of convenience, a difference in distance is represented by a difference in hatching, and only two distance values are represented in addition to the background. However, in practice, the distance value can, of course, include more values than the background distance. In addition, although an example in which the distance image 20D of FIG. 6 is a processing target is described below, for convenience, only an example of a processing result other than a shape of a body of the subject 90 is schematically illustrated in FIGS. 7 to 11.

Next, the standard deviation image calculation unit 13 performs preprocessing on the distance image data with respect to the distance image series, based on the joint key point, calculates a standard deviation for the distance image data after the preprocessing, and generates a standard deviation image (step S12).

Herein, the preprocessing may refer to processing in which an unnecessary region is deleted from the distance image series and the image is rotated in such a way as to be at a normal position when the image is not at a normal position. The unnecessary region may refer to a region that is not required for processing in the future, and may refer to, for example, a region above a neck, a region on an end side of a hand, a region below a waist, or the like. Further, the above-described rotation refers to processing of adjusting a direction and a position of an intersection line of each plane with respect to a sagittal plane, a frontal plane, and a transverse plane of the subject 90 to a normal position in such a way as to be suitable for the processing, based on the joint key point. Note that the preprocessing may include processing such as deletion of a region and deformation of an image other than rotation of the image.

By such preprocessing, it is possible to leave the data of the region illustrated by the distance image 20D of FIG. 6, for example, for each distance image of the distance image series being input in step S11. Hereinafter, for the sake of convenience, an example in which the distance image series of the region indicated by the distance image 20D is a processing target will be described.

In step S12, the standard deviation image calculation unit 13 calculates the standard deviation of the distance value existing in time series for each pixel of the time-series distance image 20D, and generates a standard deviation image in which the standard deviation value is arranged at a position of the original pixel. The generated standard deviation image can be, for example, a standard deviation image 20S illustrated in FIG. 7. In the following description, it is assumed that the standard deviation image 20S is generated in step S12. In FIG. 7, the vertical axis represents pixel rows (in units of pixels) and the horizontal axis represents pixel columns (in units of pixels).

In the standard deviation image 20S, it can be seen that a region where there is a lot of movements during the breathing exercise of the subject 90 is expressed darkly. In the standard deviation image 20S, for example, it can be seen that both shoulders move well and a lateral abdomen portion (flank portion) is moving further, and an area around the abdomen moves more than both arms and an area around the chest moves more than the area around the abdomen.

Next, the division unit 15 generates, from the standard deviation image 20S, an intersection direction differential image that is an image indicating a differential value in a direction (perpendicular direction) of the intersection line between the sagittal plane and the frontal plane of the subject 90, and calculates a local minimum value and a local maximum value of the differential values of each column (step S13). For convenience, the perpendicular direction will be explained as a Y-axis direction.

The intersection direction differential image (Y-axis direction differential image) generated here will be explained. When a differential value in the Y-axis direction is calculated, for example, for a certain pixel column $20c$ in the Y-axis direction of the standard deviation image 20S, the differential value is represented by a graph 20Gc in FIG. 8, for example. In the graph 20Gc, the vertical axis represents a row of pixels, the horizontal axis represents a differential value, and points indicated by black circles each represent a maximum point and points indicated by black squares each represent a minimum point. As described above, in step S13, in order to generate the intersection direction differential image, processing of acquiring a differential value for each pixel is first performed.

The processing of step S13 is applicable to an example of a part of the chest and abdominal division processing. In other words, the chest and abdominal division processing may include processing of detecting a local minimum value and a local maximum value for each of the pixel columns in the Y-axis direction with respect to the intersection direction differential image.

Next, as a part of the chest and abdominal division processing, the division unit 15 extracts, on the intersection direction differential image, a region having the maximum area from among a region in which a pixel whose differential value is a local minimum value exists and a region in which a pixel whose differential value is a local maximum value exists (step S14).

The region in which the local minimum value and the local maximum value exist refers to a region represented by a pixel group indicating the local minimum value and the local maximum value on the intersection direction differential image, i.e., a region represented by a pixel group in which the local minimum value and the local maximum value are plotted on the intersection direction differential image. In a boundary region between the chest portion 92 and the abdomen portion 94 or the like, a plurality of pixels are connected to at least a part of the pixel group.

Therefore, in step S14, substantially, the region of the maximum area is extracted from among a region where the pixels whose differential value is a local maximum value continue and a region where the pixels whose differential value is a local minimum value continue, on the Y-axis direction differential image. By the extraction processing of step S14, for example, in a graph 20L illustrated in FIG. 9, a region represented by a chest and abdominal division line as indicated by a broken line 20cb is extracted. In FIG. 9, the vertical axis is a Y-axis and represents a row of pixels, and the horizontal axis represents a column of pixels, which is an X-axis. The chest and abdominal division line that is the broken line 20cb roughly is equivalent to a line below the rib, and a result based on anatomical knowledge is acquired.

In step S14, the division unit 15 further sets a region on the standard deviation image, which is associated to the extracted result, as a boundary region for dividing the chest region and the abdominal region. This boundary region may be a boundary line represented by a thickness of one pixel as illustrated by the broken line 20cb in the graph 20L illustrated in FIG. 9, but may be represented by a thickness of a plurality of pixels.

Next, the division unit 15 executes the following processing as an example of the left-right division processing described above (step S15). In step S15, as the joint position data, data whose reference point is a point closest to a head side in the boundary region are input, and both the chest region and the abdominal region in the standard deviation image 20S are divided into a left-side region and a right-side region by a straight line passing through the reference point and parallel to the intersection line.

The left-right division line to be divided into the left-side region and the right-side region is a line indicated by a broken line 20lr in FIG. 9. It can be seen that the broken line 20lr is a straight line passing through the reference point and extending in a perpendicular direction with the position of the maximum value in the boundary region indicated by the broken line 20cb as a reference point. Herein, since the joint key point is used by the preprocessing, it can be said that the joint key point being input in step S11 is also used for the determination of the perpendicular direction herein.

In a case where a result of the chest and abdominal division processing is referred to in the left-right division processing as described above, it is basically assumed that the processing of detecting the joint is executed by the information processing apparatus 10 side instead of the imaging device 20 side. However, even in a case of adopting the left-right division processing as in step S15, the chest and abdominal division processing is not limited to the processing using the local maximum value and the local minimum value described above. The chest and abdominal division processing may be any processing as long as it can acquire a boundary region that serves as a boundary for dividing a region on the standard deviation image into a chest region and an abdominal region by image analysis of the distance image series.

Further, as described above, the left-right division processing may be divided as a straight line passing through the reference point and extending in the perpendicular direction, based on a predetermined reference point indicated by the joint key point being input in step S11, without using an image analysis result of the distance image series.

In the processing up to step S15, the chest and abdominal division processing and the left-right division processing are completed. Thereafter, the display control unit 17 performs drawing such that the region division result indicated by the broken line 20cb and the broken line 20lr in FIG. 9 is superimposed on the standard deviation image 20S, for example, and causes the display device 30 to display an image of the drawing result (step S16), and ends the processing.

Thus, for example, an image 20SL illustrated in FIG. 10 can be displayed on the display device 30. In addition, instead of the image 20SL, an image including at least one of a legend indicating a magnitude of the movement indicated by the standard deviation value and the name of each divided region may be displayed as in an image 30SL illustrated in FIG. 11. In the image 30SL, names "right chest", "left chest", "right abdomen", and "left abdomen" of the divided regions may be displayed on the outside of the standard deviation image by using a lead line or the like. Although FIGS. 10 and 11 illustrate an example in which a difference between the standard deviation values is indicated by density of hatching, it can actually be expressed with a multi-color gradation.

Further, in the image 30SL, the result of dividing the abdominal region and a waist region by a one-dot chain line 20bc and a result of dividing the chest region and an arm region are also illustrated, and these divisions can be executed based on joint key points. As described above, the division unit 15 can also determine a boundary region for dividing the abdominal region and the waist region and a boundary region for dividing the chest region and the arm region, based on the joint key points. Note that the arm region may be excluded by preprocessing.

With the display control as described above, the display device 30 can present, to the subject 90, a state of movement of the subject 90 accompanied by the result of the region division based on the anatomical knowledge. This may provide more detailed feedback to the subject 90, either directly or via an instructor, to facilitate understanding of the synchrony between regions of the subject's 90 breathing.

Herein, only one example of the respiratory feature amount that can be calculated from the standard deviation image will be given. Of course, the respiratory feature amount is not limited to this example.

The standard deviation image calculation unit 13 may be configured to calculate an average value of standard deviations indicated by the standard deviation image for each divided region indicated by the result of the above-described division processing. For example, an average value of standard deviations of the chest region and an average value of standard deviations of the abdominal region may be the respiratory feature amount. Alternatively, an average value of standard deviations of the left chest region, an average value of standard deviations of the right chest region, an average value of standard deviations of the left abdomen, and an average value of standard deviations of the right abdomen can be set as the respiratory feature amount. In any case, the average value calculated in this configuration example may be an index indicating a balance of expansion and contraction of the flank portion, which is an end side region extending from the chest portion to the abdomen portion, and may be one of the respiratory feature amounts. The calculated average value can also be displayed on the display device 30, for example.

As described above, according to the present example embodiment, as in the first example embodiment, it is possible to divide the standard deviation image indicating the movement of the subject into a chest region and an abdominal region in line with anatomical knowledge. Further, according to the present example embodiment, the standard deviation image can also be divided into a left-side region and a right-side region.

In particular, in the present example embodiment, by executing the left-right division processing using the division results of the chest region and the abdominal region, the standard deviation image can be divided into the left-side region and the right-side region in accordance with anatomical knowledge. This effect is supplementarily described. As described in the first example embodiment, for example, an abnormal breathing pattern occurs in a musculoskeletal disorder such as a low back pain, and therefore, movement examination and movement evaluation of the chest and abdomen portion during a breathing exercise are important. In addition, since these inspection and evaluation by experts are generic, objective and quantitative inspection technique and evaluation technique are required. In the present example embodiment, the standard deviation image can be divided not only into the chest region and the abdominal region but also into the left-side region and the right-side region in accordance with anatomical knowledge, and thus it can be said that the accuracy of such examination and evaluation can be improved.

In short, with such a configuration, it is possible to perform region identification between the chest region and the abdominal region, and region identification between the left-side region and the right-side region in line with the anatomical knowledge, thereby achieving the following effects. In other words, with such a configuration, for example, respiratory feature amounts of the right chest portion, the left chest portion, the right abdomen portion, and the left abdomen portion can be accurately calculated for each region, and respiratory feature amounts for musculoskeletal disorders can be correctly defined. With such a configuration, it is possible to improve the accuracy of examination for capturing the movement of the right chest portion, the left chest portion, the right abdomen portion, and the left abdomen portion, and to improve the precision of estimation of the breathing state of the subject. As a result, the accuracy of evaluation of the breathing movement can be improved, and the accuracy of the guidance using the evaluation can also be improved, and effective guidance becomes possible.

In addition, in the present example embodiment, effective guidance can be performed by using an instructor such as a therapist at a time of rehabilitation in a medical institution or breathing exercise practice in a healthcare service. Further, in the present example embodiment, the information processing apparatus 10 is mounted on a terminal device or the like to be used by the subject, whereby the subject can receive remote instruction from the instructor and perform voluntary training while being at home.

For example, at a time of rehabilitation in a medical institution or breathing exercise practice in a healthcare service, effective guidance can be provided by use of an instructor such as a therapist. Further, by implementing the information processing apparatus 10 or the information processing apparatus 10 and the display device 30 as a terminal device to be used by the subject, the subject can receive remote instruction from the instructor and perform voluntary training while being at home. In particular, by mounting the function of the information processing apparatus 10 as an application or the like in a portable terminal device such as a tablet terminal to be used by a subject, it becomes easier for the subject 90 to perform breathing training. The imaging device 20 can also use a camera or the like mounted on the terminal device.

In addition, in the present example embodiment, an example in which the supine position is adopted as the posture of the subject at the time of acquiring the distance image data has been given. However, as described in the first example embodiment, the present disclosure is not limited thereto, and may be carried out not only in the supine position but also in a supine position, a sitting position, a standing position, a knee standing position, a supine position and a leg raising position, or the like. However, an installation location of the imaging device 20, the various image processing described above, and the like may be changed as appropriate depending on the posture. The distance image data may be acquired from the front or back of the subject in accordance with the posture of the subject, but the posture that can be acquired from the front does not need to restrict the breathing of the subject.

Further, the display system 100 may include a plurality of imaging devices 20 as described above, and the subject 90 may be photographed by using the plurality of imaging devices 20. With this configuration, since the subject 90 can be photographed from a plurality of viewpoints, the distance image data can be generated from data of both viewpoints. Further, by using the plurality of imaging devices 20, it is possible to suppress the occurrence of a blind spot of the subject 90 at the time of photographing, it is possible to perform the detection of the displacement amount or the like which can be used for calculation of other respiratory feature amount with high precision, it is also possible to calculate the respiratory feature amount with high precision.

Further, the display system 100 may be achieved by a device in which two or more of the imaging devices 20, the display device 30, and the information processing apparatus 10 are integrally configured. For example, the subject 90 may perform breathing training or breathing examination by using one device (e.g., a smartphone, etc.) including the imaging device 20, the display device 30, and the information processing device 10. This allows breathing training and breathing examination to be performed without special equipment. For example, the subject 90 can perform breathing training and breathing examination at home or the like without hesitation.

Further, for example, the display system 100 may be configured such that a sensor for detecting a ratio of carbon dioxide is provided in a nose or the like of the subject 90, and an exhalation analysis is performed based on a detection result of the sensor. With such a configuration, for example, it can be used to extract time-series distance image data for calculating a standard deviation image, i.e., it can be used to specify a period of use data.

Further, by using this sensor, it is possible to easily classify time-series distance image data into expiratory phase data and inspiratory phase data from the detection result of this sensor. Therefore, since an expiratory phase and an inspiratory phase in the time-series distance image data can be specified by such a configuration, display combined with calculation and a division result of the standard deviation image in the expiratory phase and display combined with calculation and a division result of the standard deviation image in the inspiratory phase become possible. In short, with such a configuration, both the standard deviation image for the expiratory phase and the standard deviation image for the inspiratory phase can be calculated and output together with the division result.

Modified Example

The present disclosure is not limited to the above-described example embodiments, and can be appropriately modified without departing from the scope and spirit. For example, one or more of the above-described components of each device may be omitted as appropriate. Also, for example, one or more of the steps of the above-described flowcharts may be omitted as appropriate. Also, the order of one or more of the steps in the flowcharts described above may be changed as appropriate.

In addition, the information processing apparatus may generate a respiratory feature amount acquired by processing of a breathing waveform or a light load, based on data acquired during the breathing training or the breathing examination, display the result on the display device 30 in real time, and update the result over time. As non-real-time processing, as described in the second example embodiment, the standard deviation image and the division result, which are acquired by using the stored time-series distance image data and the like, can be displayed on the display device 30. Further, as the non-real-time processing, the information processing apparatus can display the various kinds of respiratory feature amounts, which are acquired by using the stored time-series distance image data or the like, on the display device 30.

Figure 12:
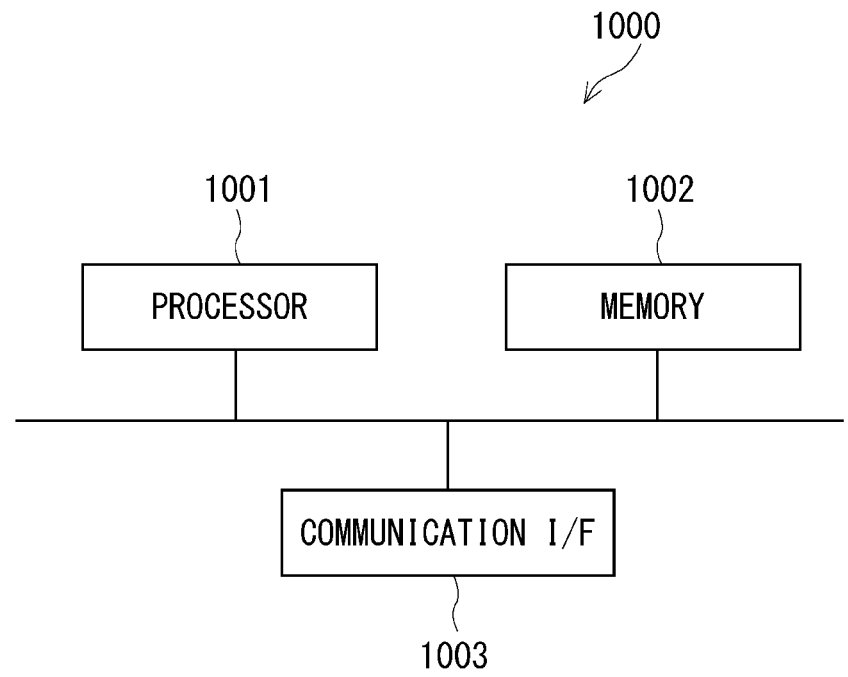
FIG. 12 is a diagram illustrating an example of a hardware configuration included in the apparatus according to the present disclosure.

Each of the apparatuses according to the first and second example embodiments can have the following hardware configuration. FIG. 12 is a diagram illustrating an example of a hardware configuration included in the apparatus according to the present disclosure.

An apparatus 1000 illustrated in FIG. 12 includes a processor 1001, a memory 1002, and a communication interface 1003. The function of each device can be achieved by the processor 1001 reading a program stored in the memory 1002 and executing the program in cooperation with the communication interface 1003.

The program includes instructions (or software codes) that, when loaded into a computer, cause the computer to perform one or more of the functions described in the example embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disc (DVD), Blu-ray disc or other optical disc storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

The first and second example embodiments can be combined as desirable by one of ordinary skill in the art.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

The whole or part of the example embodiments disclosed above can be described as, but not limited to, the following supplementary notes.

Supplementary Note 1

An information processing apparatus including:
an input unit configured to input time-series distance image data acquired by measuring a distance from a subject during a breathing exercise;
a calculation unit configured to calculate a standard deviation image indicating a standard deviation of values for each pixel in a distance image indicated by the time-series distance image data;
a division unit configured to execute division processing of dividing the standard deviation image into a chest region and an abdominal region of the subject by using a differential value in a direction of an intersection line between a sagittal plane and a frontal plane of the subject with respect to the standard deviation image; and
an output unit configured to output a result of the division processing by superimposing the result on the standard deviation image.

Supplementary Note 2

The information processing apparatus according to supplementary note 1, wherein
the input unit inputs joint position data acquired by measuring a position of a joint of the subject, and
the division processing includes a left-right division processing of dividing the standard deviation image into a left-side region and a right-side region, based on a joint position indicated by the joint position data, the left-side region being a region on a left side toward a front of the subject, the right-side region being a region on a right side toward the front of the subject.

Supplementary Note 3

The information processing apparatus according to supplementary note 2, wherein the joint position data are data acquired by measuring a position of a joint of the subject with respect to at least one time of a period associated to the time-series distance image data.

Supplementary Note 4

The information processing apparatus according to supplementary note 2 or 3, wherein the left-right division processing includes dividing the standard deviation image into the left-side region and the right-side region, with a position of a predetermined joint indicated by the joint position data as a reference point.

Supplementary Note 5

The information processing apparatus according to any one of supplementary notes 2 to 4, wherein the joint position data are data acquired by performing image analysis on the time-series distance image data.

Supplementary Note 6

The information processing apparatus according to supplementary note 4, wherein
the division processing includes as a result of the division processing, acquiring a boundary region serving as a boundary dividing an area on the standard deviation image into the chest region and the abdominal region, and
the left-right division processing includes inputting, as the joint position data, data having a point closest to a head side in the boundary region as the reference point, and dividing both the chest region and the abdominal region in the standard deviation image into the left-side region and the right-side region by a straight line passing through the reference point and parallel to the intersection line.

Supplementary Note 7

The information processing apparatus according to any one of supplementary notes 1 to 6, wherein the division processing includes detecting a local minimum value and a local maximum value for each of pixel columns in a direction of the intersection line with respect to an intersection direction differential image being an image indicating a differential value in a direction of the intersection line, extracting a region having a maximum area among regions where the local minimum value and the local maximum value exist, on the intersection direction differential image, and setting a region on the standard deviation image associated to an extracted result as a boundary region for dividing the chest region and the abdominal region.

Supplementary Note 8

The information processing apparatus according to any one of supplementary notes 1 to 7, wherein the time-series distance image data are data measured for one or a plurality of breathing cycles of the subject.

Supplementary Note 9

The information processing apparatus according to any one of supplementary notes 1 to 8, wherein the time-series distance image data are data measured while the subject is breathing deep.

Supplementary Note 10

The information processing apparatus according to any one of supplementary notes 1 to 9, wherein the calculation unit calculates an average value of standard deviations indicated by the standard deviation image for each divided region indicated by a result of the division processing.

Supplementary Note 11

An information processing method including:
inputting time-series distance image data acquired by measuring a distance from a subject during a breathing exercise;

calculating a standard deviation image indicating a standard deviation of values for each pixel in a distance image indicated by the time-series distance image data;
executing division processing by using a differential value in a direction of an intersection line between a sagittal plane and a frontal plane of the subject with respect to the standard deviation image, the division processing dividing the standard deviation image into a chest region and an abdominal region of the subject; and
superimposing a result of the division processing on the standard deviation image and outputting the superimposed result.

Supplementary Note 12

The information processing method according to supplementary note 11, further including inputting joint position data acquired by measuring a position of a joint of the subject,
wherein the division processing includes left-right division processing of dividing the standard deviation image into a left-side region and a right-side region, based on a joint position indicated by the joint position data, the left-side region being a region on a left side toward a front of the subject, the right-side region being a region on a right side toward the front of the subject.

Supplementary Note 13

The information processing method according to supplementary note 12, wherein the joint position data are data acquired by measuring a position of a joint of the subject with respect to at least one time of a period associated to the time-series distance image data.

Supplementary Note 14

The information processing method according to supplementary note 12 or 13, wherein the left-right division processing includes dividing the standard deviation image into the left-side region and the right-side region with a predetermined joint position indicated by the joint position data as a reference point.

Supplementary Note 15

The information processing method according to any one of supplementary notes 12 to 14, wherein the joint position data are data acquired by performing image analysis on the time-series distance image data.

Supplementary Note 16

The information processing method according to supplementary note 14, wherein
the division processing includes acquiring a boundary region serving as a boundary dividing a region on the standard deviation image into the chest region and the abdominal region, as a result of the division processing, and
the left-right division processing includes inputting, as the joint position data, data having a point closest to a head side in the boundary region as the reference point, and dividing both the chest region and the abdominal region in the standard deviation image into the left-side region and the right-side region by a straight line passing through the reference point and parallel to the intersection line.

Supplementary Note 17

The information processing method according to any one of supplementary notes 11 to 16, wherein the division processing includes detecting a local minimum value and a local maximum value for each of pixel columns in a direction of the intersection line with respect to an intersection direction differential image being an image indicating a differential value in a direction of the intersection line, extracting a region having a maximum area among regions where the local minimum value and the local maximum value exist on the intersection direction differential image, and setting a region on the standard deviation image associated to an extracted result as a boundary region for dividing the chest region and the abdominal region.

Supplementary Note 18

The information processing method according to any one of supplementary notes 11 to 17, wherein the time-series distance image data are data measured for one or a plurality of breathing cycles of the subject.

Supplementary Note 19

The information processing method according to any one of supplementary notes 11 to 18, wherein the time-series distance image data are data measured while the subject is breathing deep.

Supplementary Note 20

The information processing method according to any one of supplementary notes 11 to 19, further including calculating an average value of standard deviations indicated by the standard deviation image for each divided region indicated by a result of the division processing.

Supplementary Note 21

A program causing a computer to execute information processing of:

inputting time-series distance image data acquired by measuring a distance from a subject during a breathing exercise;

calculating a standard deviation image indicating a standard deviation of values for each pixel in a distance image indicated by the time-series distance image data;

executing division processing of dividing the standard deviation image into a chest region and an abdominal region of the subject by using a differential value in a direction of an intersection line between a sagittal plane and a frontal plane of the subject with respect to the standard deviation image; and superimposing a result of the division processing on the standard deviation image and outputting the superimposed result.

Supplementary Note 22

The program according to supplementary note 21, wherein the information processing further includes joint position data acquired by measuring a position of a joint of the subject, and the division processing includes a left-right division processing of dividing the standard deviation image into a left-side region and a right-side region, based on joint position indicated by the joint position data, the left-side region being a region on a left side toward a front of the subject, the right-side region being a region on a right side toward the front of the subject.

Supplementary Note 23

The program according to supplementary note 22, wherein the joint position data are data acquired by measuring a position of a joint of the subject with respect to at least one time of a period associated to the time-series distance image data.

Supplementary Note 24

The program according to supplementary note 22 or 23, wherein the left-right division processing includes dividing the standard deviation image into the left-side region and the right-side region with a predetermined joint position indicated by the joint position data as a reference point.

Supplementary Note 25

The program according to any one of supplementary notes 22 to 24, wherein the joint position data are data acquired by image analysis on the time-series distance image data.

Supplementary Note 26

The program according to supplementary note 24, wherein the division processing includes acquiring a boundary region that serves as a boundary dividing a region on the standard deviation image into the chest region and the abdominal region, as a result of the division processing, and the left-right division processing includes inputting, as the joint position data, data having a point closest to a head side in the boundary region as the reference point, and dividing both the chest region and the abdominal region in the standard deviation image into the left-side region and the right-side region by a straight line passing through the reference point and parallel to the intersection line.

Supplementary Note 27

The program according to any one of supplementary notes 21 to 26, wherein the division processing includes detecting a local minimum value and a local maximum value for each of pixel columns in a direction of the intersection line with respect to an intersection direction differential image being an image indicating a differential value in a direction of the intersection line, extracting a region having a maximum area among regions where the local minimum value and the local maximum value exist, on the intersection direction differential image, and setting a region on the standard deviation image associated to an extracted result as a boundary region for dividing the chest region and the abdominal region.

Supplementary Note 28

The program according to any one of supplementary notes 21 to 27, wherein the time-series distance image data are data measured for one or a plurality of breathing cycles of the subject.

Supplementary Note 29

The program according to any one of supplementary notes 21 to 28, wherein the time-series distance image data are data measured while the subject is breathing deep.

Supplementary Note 30

The program according to any one of supplementary notes 21 to 29, wherein the information processing includes processing of calculating an average value of standard deviations indicated by the standard deviation image for each divided region indicated by a result of the division processing.

According to the present disclosure, it is possible to provide an information processing apparatus, an information processing method, and a program that are capable of dividing an image indicating a movement of a subject into a chest region and an abdominal region in line with anatomical knowledge.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. An information processing apparatus comprising
at least one memory storing instructions, and
at least one processor configured to execute the instructions to:
input time-series distance image data acquired by measuring a distance from a subject during a breathing exercise;
calculate a standard deviation image indicating a standard deviation of values for each pixel in a distance image indicated by the time-series distance image data;
execute division processing of dividing the standard deviation image into a chest region and an abdominal region of the subject, by using a differential value in a direction of an intersection line between a sagittal plane and a frontal plane of the subject with respect to the standard deviation image; and
output a result of the division processing by superimposing the result on the standard deviation image.

2. The information processing apparatus according to claim 1, wherein
the inputting includes inputting joint position data acquired by measuring a position of a joint of the subject, and
the division processing includes left-right division processing of dividing the standard deviation image into a left-side region and a right-side region, based on a joint position indicated by the joint position data, the left-side region being a region on a left side toward a front of the subject, the right-side region being a region on a right side toward the front of the subject.

3. The information processing apparatus according to claim 2, wherein the joint position data are data acquired by measuring a position of a joint of the subject with respect to at least one time of a period associated to the time-series distance image data.

4. The information processing apparatus according to claim 2, wherein the left-right division processing includes dividing the standard deviation image into the left-side region and the right-side region with a predetermined joint position indicated by the joint position data as a reference point.

5. The information processing apparatus according to claim 2, wherein the joint position data are data acquired by image analysis on the time-series distance image data.

6. The information processing apparatus according to claim 4, wherein
the division processing includes acquiring a boundary region that serves as a boundary dividing a region on the standard deviation image into the chest region and the abdominal region, as a result of the division processing, and
the left-right division processing includes inputting, as the joint position data, data having a point closest to a head side in the boundary region as the reference point, and dividing both the chest region and the abdominal region in the standard deviation image into the left-side region and the right-side region by a straight line passing through the reference point and parallel to the intersection line.

7. The information processing apparatus according to claim 1, wherein the division processing includes detecting a local minimum value and a local maximum value for each of pixel columns in a direction of the intersection line with respect to an intersection direction differential image being an image indicating a differential value in a direction of the intersection line, extracting a region having a maximum area among regions where the local minimum value and the local maximum value exist, on the intersection direction differential image, and setting a region on the standard deviation image associated to an extracted result as a boundary region for dividing the chest region and the abdominal region.

8. The information processing apparatus according to claim 1, wherein the time-series distance image data are data measured for one or a plurality of breathing cycles of the subject.

9. The information processing apparatus according to claim 1, wherein the time-series distance image data are data measured while the subject is breathing deep.

10. The information processing apparatus according to claim 1, wherein the calculating includes calculating an average value of standard deviations indicated by the standard deviation image for each divided region indicated by a result of the division processing.

11. An information processing method comprising:
inputting time-series distance image data acquired by measuring a distance from a subject during a breathing exercise;
calculating a standard deviation image indicating a standard deviation of values for each pixel in a distance image indicated by the time-series distance image data;
executing division processing of dividing the standard deviation image into a chest region and an abdominal region of the subject, by using a differential value in a direction of an intersection line between a sagittal plane and a frontal plane of the subject with respect to the standard deviation image; and superimposing a result of the division processing on the standard deviation image and outputting the superimposed result.

12. The information processing method according to claim 11, further comprising inputting joint position data acquired by measuring a position of a joint of the subject, wherein the division processing includes left-right division processing of dividing the standard deviation image into a left-side region and a right-side region, based on a joint position indicated by the joint position data, the left-side region being a region on a left side toward a front of the subject, the right-side region being a region on a right side toward the front of the subject.

13. The information processing method according to claim 12, wherein the joint position data are data acquired by measuring a position of a joint of the subject with respect to at least one time of a period associated to the time-series distance image data.

14. The information processing method according to claim 12, wherein the left-right division processing includes dividing the standard deviation image into the left-side region and the right-side region with a predetermined joint position indicated by the joint position data as a reference point.

15. The information processing method according to claim 12, wherein the joint position data are data acquired by image analysis on the time-series distance image data.

16. A non-transitory computer readable medium storing a program causing a computer to execute information processing of:

inputting time-series distance image data acquired by measuring a distance from a subject during a breathing exercise;

calculating a standard deviation image indicating a standard deviation of values for each pixel in a distance image indicated by the time-series distance image data;

executing division processing of dividing the standard deviation image into a chest region and an abdominal region of the subject, by using a differential value in a direction of an intersection line between a sagittal plane and a frontal plane of the subject with respect to the standard deviation image; and superimposing a result of the division processing on the standard deviation image and outputting the superimposed result.

17. The non-transitory computer readable medium according to claim 16, wherein the information processing includes inputting joint position data acquired by measuring a position of a joint of the subject, and the division processing includes left-right division processing of dividing the standard deviation image into a left-side region and a right-side region, based on a joint position indicated by the joint position data, the left-side region being a region on a left side toward a front of the subject, the right-side region being a region on a right side toward the front of the subject.

18. The non-transitory computer readable medium according to claim 17, wherein the joint position data are data acquired by measuring a position of a joint of the subject for at least one time of a period associated to the time-series distance image data.

19. The non-transitory computer readable medium according to claim 17, wherein the left-right division processing includes dividing the standard-deviation image into the left-side region and the right-side region with a predetermined joint position indicated by the joint position data as a reference point.

20. The non-transitory computer readable medium according to claim 17, wherein the joint position data are data acquired by image analysis on the time-series distance image data.

* * * * *